United States Patent [19]
Scott

[11] Patent Number: 5,246,793
[45] Date of Patent: Sep. 21, 1993

[54] BATTERY SAFETY UNIT

[76] Inventor: Ronald Scott, Rte. 3, Box 42, Lumberton, N.C. 28358

[21] Appl. No.: 719,113

[22] Filed: Jun. 21, 1991

[51] Int. Cl.$^5$ .................. H01M 2/04; H01M 2/08; H01M 2/10

[52] U.S. Cl. .................. 429/99; 429/175; 429/176

[58] Field of Search ............... 429/99, 175, 176, 163

[56] References Cited

U.S. PATENT DOCUMENTS

| | | | |
|---|---|---|---|
| 1,497,786 | 6/1924 | Hoge | 429/99 |
| 1,546,422 | 7/1925 | Whitehead | 429/99 |
| 3,825,447 | 7/1974 | Kraals | 429/175 |
| 4,160,857 | 7/1979 | Mardella et al. | 429/99 |
| 4,693,949 | 9/1987 | Kellett et al. | 429/176 |
| 5,017,441 | 5/1991 | Lindner | 429/99 |
| 5,017,443 | 5/1991 | Tominaga et al. | 429/99 |
| 5,017,443 | 5/1991 | Tominaga | 429/99 |

*Primary Examiner*—Wayne Langel
*Attorney, Agent, or Firm*—Olive & Olive PA

[57] ABSTRACT

A battery safety unit is disclosed which protects against damage from dangerous acid contained in wet cell automobile batteries. The unit is a molded battery container adapted to anchor a battery securely in a moving automobile while the battery is essentially completely enclosed. The unit has a cover which may be opened or removed simply, but is safely held in place by a plurality of catches and a hinge in ordinary use. Variations in size and shape may be made to accommodate the particular battery being used.

6 Claims, 2 Drawing Sheets

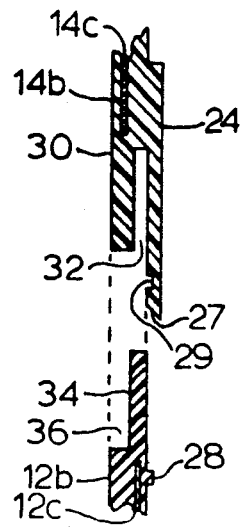
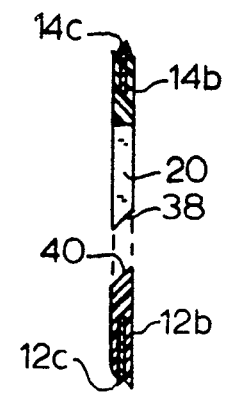
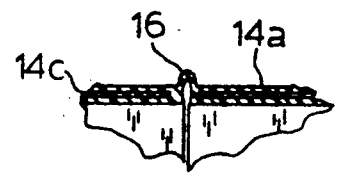
FIG. 3
FIG. 3A
FIG. 4
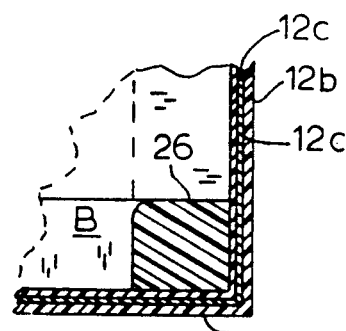
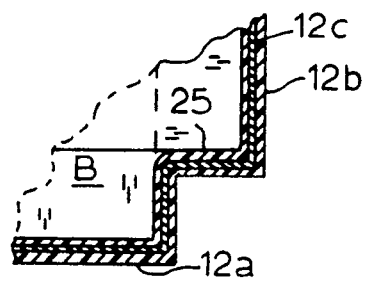
FIG. 5
FIG. 5A
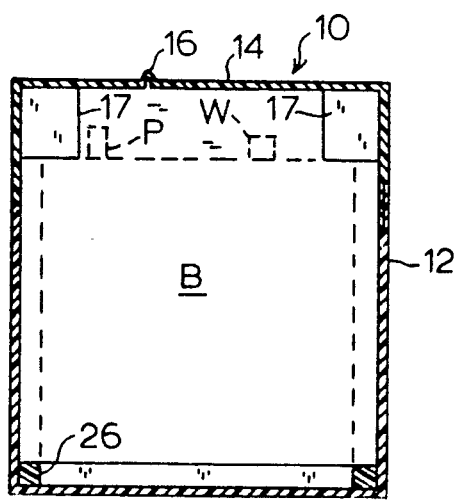
FIG. 8

BATTERY SAFETY UNIT

BACKGROUND OF THE INVENTION

1. Field of the Invention

This invention relates to the field of automotive electrical batteries, and more particularly to the safety and service life thereof.

2. Background of the Prior Art

Every automobile on the road today contains at least one wet cell battery. The battery is an indispensable part of the drive system, providing electrical power for such functions as engine starting, ignition, lights, etc. The heart of the battery is a reservoir of sulfuric acid which chemically reacts with a pair of opposite metallic poles to establish a voltage between them. This voltage is used to run the automobile's electrical devices, such as those mentioned above.

The acid contained in a battery is strong enough to cause serious damage to many parts of the automobile and serious injury to the skin of a person coming in contact with it. This acid can discharge dangerous fumes in cases of overheating due to electrical problems or ambient conditions. Under extreme circumstances a battery can actually explode, spraying its acid in all directions.

If any of these accidents occurs, in addition to damage to the automobile and the people nearby, there will be extensive environmental damage. When liquid or gaseous sulfuric acid is released due to a battery accident it can harm ground water supplies and air quality. The ultimate effect on the health of plants, animals and people may be disastrous. Thus, the effect of a sulfuric acid leak can be widespread, with the damage being multiplied due to the cumulative effect of many such leaks from even a small percentage of the hundreds of millions of cars in operation today.

Some recent automobile batteries have been designed s that they do not require maintenance or the addition of water. These "service free" batteries have been included as manufacturer supplied original equipment on many vehicles. Although batteries of this type are designed to operate without requiring added water, they still have a danger of leakage or explosion.

Another area of concern is the service life of the battery under ordinary and extraordinary conditions. If a battery becomes too cold it will not function properly, because the electrical power output is somewhat reduced. If the battery becomes too hot it will physically deteriorate more quickly than usual and require replacement sooner.

For an automobile battery to perform its function over a long life, it must be accessible for occasional servicing. Such servicing includes checking the amount of acid in the battery and replenishing water (from which the battery forms acid during operation) in the reservoir when low. In case of battery failure it is necessary to have access to the battery to attach auxiliary cables to the terminal posts of the battery to charge the battery or to start the engine. A battery also must be accessible so that it may be removed for replacement with a new battery.

It is therefore an objective of the present invention to provide a unit that will protect both people handling an automotive battery and automotive equipment surrounding a battery from accidental spills of battery acid.

It is another objective of the present invention to provide a battery safety unit that will prevent environmental pollution damage due to battery accidents.

It is a further objective of the present invention to provide a unit that will improve battery life and performance.

It is a still further objective of the present invention to provide a unit that will allow simple and efficient removal, replacement and servicing of an automotive battery.

These and additional objectives of the invention will become apparent to those skilled in the art as the details of the invention are disclosed.

SUMMARY OF THE INVENTION

The present invention provides a safety unit for use in an automobile which unit contains and encloses the wet cell battery to permit servicing and replacement of the battery while protecting against spills, fumes or explosion. The invention provides a rectangular receptacle into which a battery may be placed securely. The receptacle has a removable cover which interlockingly closes, and which has a hinge to permit the forward portion of the cover to be opened or the entire top to be removed for work on the battery. Apertures are afforded through which the connective cables may be passed after which the cover is kept closed.

Other aspects and features of the invention will be more fully apparent from the following disclosure and appended claims.

BRIEF DESCRIPTION OF THE DRAWINGS

FIG. 3 is a partial section view taken along line 3—3 of FIG. 2.

FIG. 3A is a partial section view taken along line 3A—3A of FIG. 1.

FIG. 4 is a partial section view taken along line 4—4 of FIG. 1.

FIG. 5 is a partial section view taken along line 5—5 of FIG. 6 and showing a segment of the battery in place in dashed lines.

FIG. 5A is an alternate embodiment of the partial section of FIG. 5. The dashed lines show a segment of the battery in place in the unit of the invention.

FIG. 8 is a sectional side elevation view of the battery safety unit taken in the direction of line 8-8 of FIG. 1.

DETAILED DESCRIPTION OF THE INVENTION AND PREFERRED EMBODIMENTS THEREOF

The invention as disclosed herein relates to a safety unit for containing an automotive battery and is configured as a durable box with a hinged, removable cover having holes for the passing of the cables to electrically connect the battery terminals to the components of the automobile.

Figure 1:
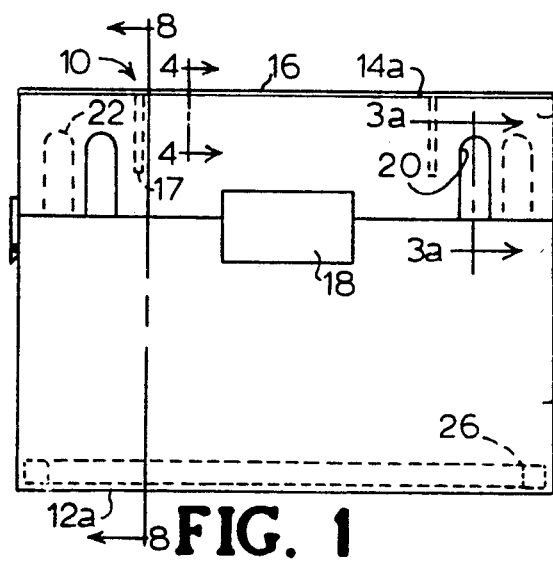
FIG. 1 is an elevation view of the front of the battery safety unit on the invention.

FIG. 1 portrays a front elevation view of the battery safety unit 10 of the invention. The unit 10 may be fixedly mounted into the automobile in any convenient and secure manner. The main components of the unit are a base 12 and a cover 14. Cover 14 is held in place on the base 12 by means of a plurality of catches 18, 24. The bottom plate 12a of the base 12 and the top plate 14a of the cover 14 are substantially equal in dimension so that cover 14 sits on base 12 with top walls 14b essentially coinciding dimensionally with the base walls 12b. The front catch 18 and side catches 24 are formed adjacent the outer surface of the top walls 14b and adapted to slidingly engage base wall 12b, thereupon snapping around and onto lock tabs 28 (see also FIG. 3).

Figure 2:
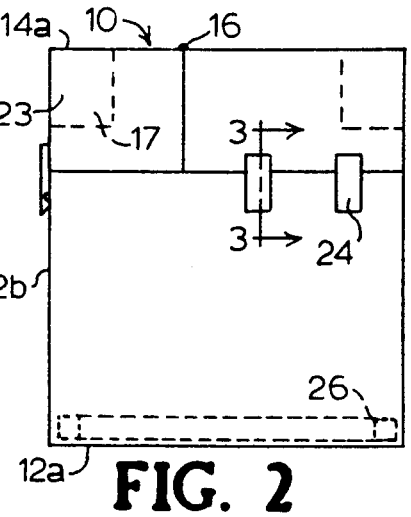
FIG. 2 is an elevation view of the side of the battery safety unit of the invention.
Figure 6:
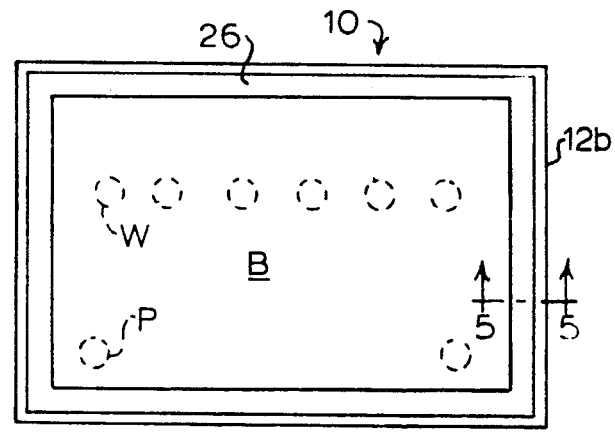
FIG. 6 is a top plan view of the battery safety unit base with a wet cell battery installed.

FIG. 2 shows a side elevation view of the unit 10 and some detail of cover 14. Preferably located off-center on the top plate 14a of cover 14 is hinge 16 running from side to side along a line parallel to the front and rear edges of top plate 14a. Hinge 16 permits front portion 23 of cover 14 to be articulated upwardly to expose a portion of the battery within unit 10. With front portion 23 of cover 14 in the open position, the battery cables can be connected or supplemental cables attached to charge the battery. When it is necessary to replenish water in the battery or to replace the battery with another, cover 14 may be removed totally by releasing catches 18, 24 as discussed above. This exposes the top of the battery as shown in FIG. 6 so that the water-filling wells W may be filled. Hinge 16 may be of any conventional construction, including an integrally molded hinge as is common in plastic articles.

As illustrated in FIG. 3, top side walls 14b and base walls 12b at the sides and rear of unit 10 are each built with a lip and groove, respectively. As cover 14 is brought into contact with base 12, cover lip 30 slides into base groove 36 and base lip 34 slides into cover groove 32 thus creating an overlapping, sealing joint. As cover 14 approaches engagement with the base 12, catch 24 is forced outwardly by the lower angled end 27 of catch 24 contacting and riding over lock tab 28 in cam-like action. When the cover 14 is completely onto base 12, catch 24 snaps inwardly as lock tab 28 engages lock slot 29. The configuration of lock tab 28 and catch 24 are such that disengagement requires that catch 24 be stressed outwardly to clear lock tab 28 as the cover 14 is lifted.

In the preferred embodiment both sides and the rear of base 12 and cover 14 have similar lip and groove components. Due to the arcuate motion of the front of cover 14 as the front portion 23 is pivoted open, an overlapping lip such as is used on the rear and sides of unit 10 is not practical. As depicted in FIG. 3A, the front edge closure configuration differs from the side and rear arrangement shown in FIG. 3. In order to open and close the cover 14 without physical interference, the top wall 14b and the base wall 12b are mated with overlapping angled edges, thus allowing hinged engagement and still containing any possible splashing of sulfuric acid from the battery. By constructing a battery safety unit according to the present invention having mating lips 30, 34 and grooves 32, 36 along the rear edge and the rear portions of the sides, there is sufficient physical support for cover 14. The mating angled edge 38, 40 shown in FIG. 3A adds little physical support, but functions to contain acid within the unit. In the case of the overlapping lips of FIG. 3 or the angled edges of FIG. 3A, it is preferred to have the inner surface terminate at a level lower than that at which the outer surface terminates to cause any liquid flowing against the inner surface to remain within the unit. In the preferred embodiment, the front of unit 10 has one catch 18; the sides of unit 10 each have two catches 24; the rear has no catches. Other arrangements as to the number, size and placement of catches may be used according to the preference of the designer.

Cover 14 is further configured with a pair of cable ports 20 so as to enable the passing of the battery power cables to connect to the electrical components of the vehicle (FIG. 1). The particular placement of cable ports 20 will be determined by the placement of the terminal posts on the particular battery being employed. It is advantageous to provide for various cable port locations to permit a single model battery safety unit 10 to adapt to a number of commercially available automotive batteries having different post positions. Thus, the unit may be produced with a series of cable port locations, such as shown at 20 and 22, which may be outlined, for example, by a series of perforations, in a comparatively thin plastic wall. When the battery is inserted into unit 10, the appropriate portion of cover 14 is punched out to form a pair of cable ports 20 (or 22) to permit attachment of the cables to the battery.

Vanes 17 are integrally molded into cover 14 and are configured to press downwardly against the upper corners of a battery placed within unit 10 (FIGS. 1, 2, 7, 8). Vanes 17 serve to hold the battery firmly in place. According to the preferred embodiment, the unit has four vanes 17, two in the rear corner and two in the front corner of cover 14; however, different designs and numbers of vane 17 may be employed.

As shown in FIGS. 1 and 2 a battery stabilizer 26 is located in the lower interior corners of base 12 adjacent side walls 12b and base plate 12a. Battery stabilizer 26 extends around the lower portion of all sides of base 12 so as to hold the peripheral edges of the lower corners of the battery snugly and to protect the battery from being upset in case of rapid changes in motion of the automobile. Further security to the position of the battery is afforded by vanes 17. Thus, battery stabilizer 26 is fitted to hold the lower corners of a battery as shown in partial section view with a partial battery B in FIGS. 5, 5A (5A being an alternate embodiment including alternate battery stabilizer 25). Battery stabilizer 26 may be a full block traversing the length of all four sides of unit 10, and forming right angle pieces located in the four corners of the bottom of the unit, or may be made in other shapes satisfactory to the function of securely anchoring the battery. In an alternative embodiment of the present invention, battery stabilizer 25 as seen in FIG. 5A is formed as a redirection of the bottom and side walls of unit 10 to grasp the bottom of battery B snugly while leaving space between the walls of base 12 and the battery. The height above the bottom of base 12 to which stabilizer 26 or 25 will rise is dependent upon the geometry and weight of the particular battery being used. As will be apparent, it is important that the battery stabilizer 26 creates a space in which the lower portion of the battery fits snugly to keep it from dislodging accidently. A top plan view of battery safety unit 10 (FIG. 6) portrays battery stabilizer 26 or 25 in the form as described and shown in FIGS. 5 or 5A and totally surrounding the lower portion of the battery B to hold it in place.

Figure 7:
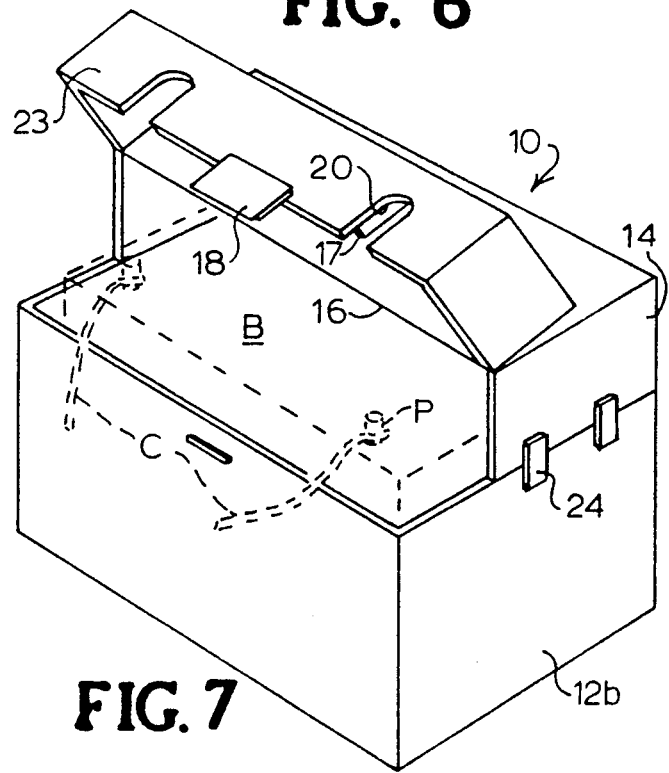
FIG. 7 is a perspective view of the battery safety unit of the invention showing the battery, in dashed lines, installed with cables attached and the cover articulated open at the front portion thereof.

A perspective view of the wet cell battery B inside battery safety unit 10 is illustrated in FIG. 7. In this view the front hinged portion 23 of cover 14 is shown in the open position, the battery B in place, and battery cables C attached to the battery terminals P. It is seen that battery B is higher than base 12 and that cover 14 allows adequate free space for clearance above the terminals when cover 14 is shut. Above battery stabilizer 26 or 25 there is a space around all sides of the battery, so that any acid spilled from the battery remains in the battery safety unit around the battery is not released to the environment and can be safely contained. The space between unit walls 12b and the battery B also allows a mechanic to lift the battery in or out.

Additional detail of the means to secure battery B in unit 10 is shown in sectional view FIG. 8. Battery B is placed into unit 10 so that battery stabilizer 26 firmly holds the lower corners of battery B. When cover 14 is attached and closed vanes 17 are in contact with the upper front and rear corners of battery B, thus preventing upward movement of the battery.

In the achievement of the objective of protecting the battery from heat and cold, the battery safety unit 10 walls, top and bottom may advantageously be constructed of insulating materials. Polycarbonate has generally good thermal insulation properties which can be further enhanced by laminating to selected insulating materials, e.g. Thermo Mat TM by Owens Corning Fiberglas Corp. or by foaming to create air voids. A particularly effective method of insulating is to laminate a sheet of Thermo Mat TM between an outer wall and an inner wall of polycarbonate. This structure provides thermal insulation and chemical resistance. This configuration is illustrated in FIGS. 3, 3A, 4, 5 and 5A with the base Thermo Mat TM insulation layer shown as 12c. The top insulating layer 14c is constructed in the same manner. The same laminated construction is preferably used throughout the battery safety unit 10.

Polycarbonate is also a particularly desirable plastic resin of choice for use in constructing the unit and hinge by reason of its imperviousness to sulfuric acid and its ability to withstand severe physical impact. Polycarbonate thus provides protection in the case of explosions. A polycarbonate that may be used is Lexan ® resin supplied by General Electric Plastics.

The battery safety unit as disclosed may be made in a variety of adaptations and variations to suit battery sizes as well as differences in automobiles. These and other variations, embodiments and modifications of the basic embodiment as disclosed herein are considered within the scope and spirit of the present invention, and accordingly all such variations, modifications, and embodiments are to be regarded as being within the spirit and scope of the invention.

What is claimed is:

1. A battery safety unit adapted to enclose a wet cell battery, comprising:
    (a) a base, comprising:
        (i) a substantially flat rectangular bottom plate;
        (ii) four upwardly directed, substantially flat rectangular walls integrally connected to said bottom plate at the edges thereof and integrally connected to each other at contacting corners to form a rectangular hollow space, said walls being configured at upper ends thereof to engage a cover, each of said walls terminating in a vertically extended lip contiguous with an outer surface of said wall, said front and side walls having front and side locking tabs positioned on said outer surfaces so as to interlock with a lock slot of a catch; and
        (iii) a battery stabilizer adapted to securely anchor a battery in said safety unit and being positioned peripherally on the bottom plate and adjacent said walls in said hollow space; wherein the walls of the battery safety unit above the battery stabilizer and the upper portion of the battery form an air space above the battery stabilizer between the walls of the safety unit and the battery so that acid spilled from the battery may be contained in said space; and
    (b) a cover removably attachable to said base walls and having a front portion and a rear portion, said cover comprising:
        (i) a substantially flat rectangular top plate being divided between said front and rear portions by a hinge configured to enable said front portion of the top plate to be upwardly articulated along said hinge and removed from the base while the rear portion is attached to the base, wherein said front portion of said cover may be opened without opening said rear portion to enable connection of electrical cables to a battery placed in said battery safety unit, or both portions may be removed from said base to remove a battery from, or place a battery in said battery safety unit;
        (ii) a pair of side walls integrally connected to said top plate and being divided between said front and rear portions along a line corresponding to the position of said hinge, each of said rear portions having one or more of said catches being affixed thereto and located to overlap said base lip and to engage a corresponding locking tab on the side wall with a lock slot formed into said catch, said side walls configured to engage said base lip;
        (iii) a rear wall connected to the rear of said top plate; and
        (iv) a front wall connected to the front edge of said top plate and having a catch located to overlap said base lip and engage said front locking tab with a lock slot formed into said catch; said front wall being formed with apertures to enable the passing of electrical cables from the terminal posts of said battery to components outside of said battery safety unit and said front wall and said rear wall being integrally connected to said side walls.

2. A battery safety unit as claimed in claim 1 in which said hinge is integrally molded with said cover.

3. A battery safety unit as claimed in claim 1 in which said battery stabilizer is formed as a rectangular peripheral block having an interior rectangular hollow space and is positioned on said base plate and adjacent said sides.

4. A battery safety unit as claimed in claim 1 in which said battery stabilizer is formed as a part of said bottom plate to tightly surround the bottom of the battery.

5. A battery safety unit as claimed in claim 1 in which said catches are integrally molded with said top walls and able to flex outwardly to engage and disengage said locking tabs.

6. A battery safety unit as claimed in claim 1 wherein said unit is made of thermally insulated material.

* * * * *